(12) United States Patent
Bae

(10) Patent No.: US 6,542,757 B2
(45) Date of Patent: Apr. 1, 2003

(54) HEADSET DOCKING DEVICE

(75) Inventor: Hyon S. Bae, Burlingame, CA (US)

(73) Assignee: Youngbo Engineering, Inc. (KR)

( * ) Notice: Subject to any disclaimer, the term of this patent is extended or adjusted under 35 U.S.C. 154(b) by 0 days.

(21) Appl. No.: 09/759,118

(22) Filed: Jan. 11, 2001

(65) Prior Publication Data

US 2002/0090981 A1 Jul. 11, 2002

(51) Int. Cl.[7] ................................................. H04B 1/38
(52) U.S. Cl. .................. 455/568; 455/569; 379/428.02; 379/430; 379/446
(58) Field of Search ................................ 379/430, 431, 379/433.01, 433.02, 438, 428.02, 428.04, 428.01, 420.04, 420.02, 420.01, 433.06, 457, 455, 446; 381/380, 384, 385, 386, 387, 395, 370, 374, 376, 379; 455/90, 568, 569

(56) References Cited

U.S. PATENT DOCUMENTS

| | | | | |
|---|---|---|---|---|
| 3,984,645 A | * | 10/1976 | Kresch | 379/430 |
| 4,691,383 A | * | 9/1987 | DeMars | 379/430 |
| 4,942,617 A | * | 7/1990 | Boylan | 381/182 |
| 5,177,784 A | * | 1/1993 | Hu et al. | 379/430 |
| 5,191,602 A | * | 3/1993 | Regen et al. | 379/419 |
| 5,201,003 A | * | 4/1993 | Pavel | 379/438 |
| 5,388,155 A | * | 2/1995 | Smith | 379/446 |
| 5,481,607 A | * | 1/1996 | Hsiao | 242/385.1 |
| 5,507,446 A | * | 4/1996 | Ditzig | 242/372 |
| 5,652,792 A | * | 7/1997 | Gallagher et al. | 379/446 |
| 5,664,012 A | * | 9/1997 | Chen | 379/420.04 |
| 5,684,883 A | * | 11/1997 | Chen | 381/370 |
| 5,703,946 A | * | 12/1997 | Chen | 379/446 |
| 5,706,353 A | * | 1/1998 | Arai et al. | 379/438 |
| 5,718,310 A | * | 2/1998 | Gallo | 191/12.2 R |
| 5,724,667 A | * | 3/1998 | Furuno | 379/422 |
| 5,749,057 A | * | 5/1998 | Takagi | 379/420.01 |
| 5,778,061 A | * | 7/1998 | Parment et al. | 379/428.02 |
| 5,835,586 A | * | 11/1998 | Skowronski | 379/446 |
| 5,839,919 A | * | 11/1998 | Chen | 379/446 |
| 5,841,859 A | * | 11/1998 | Chen | 379/430 |
| 5,845,197 A | * | 12/1998 | Hada et al. | 379/430 |
| 5,850,440 A | * | 12/1998 | Hannon et al. | 379/446 |
| 6,026,162 A | * | 2/2000 | Palett et al. | 379/446 |
| 6,047,064 A | * | 4/2000 | Lyons | 379/446 |
| 6,058,184 A | * | 5/2000 | Frank | 379/420.02 |
| 6,082,656 A | * | 7/2000 | Thornton | 191/12.4 |
| 6,094,496 A | * | 7/2000 | Stowers, Sr. | 381/361 |
| 6,144,864 A | * | 11/2000 | Lands et al. | 361/683 |
| 6,149,457 A | * | 11/2000 | Liao | 191/12.2 R |
| 6,195,572 B1 | * | 2/2001 | Patterson et al. | 379/388.03 |
| 6,301,487 B1 | * | 10/2001 | Nakamura | 379/370 |
| 6,374,126 B1 | * | 4/2002 | MacDonald et al. | 381/309 |

OTHER PUBLICATIONS

Press Release Cable–retractable Earphone Microphone; Sep. 8, 1999; Hosiden Corporation.*

* cited by examiner

Primary Examiner—Tracy Legree
(74) Attorney, Agent, or Firm—Altheimer & Gray; Michael A. Molano; John F. Griffith

(57) ABSTRACT

A headset docking device is connected to an audio device by a cord. When the headset is placed in a headset dock, a reel activation button is depressed which instantaneously retracts the cord. Examples of audio devices include a cradle, a cellular phone and a computer, all using the headset docking device.

19 Claims, 6 Drawing Sheets

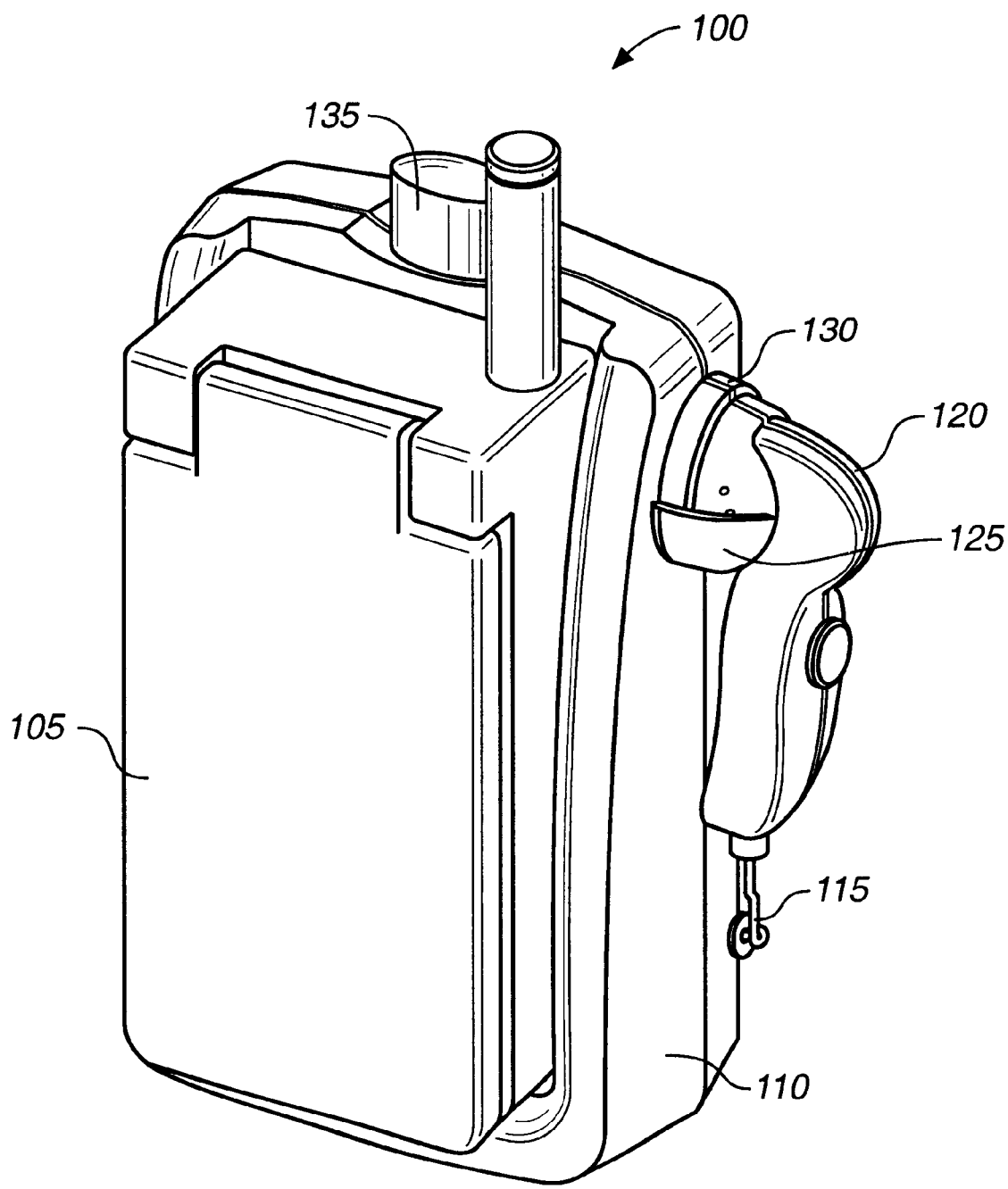
FIG._1

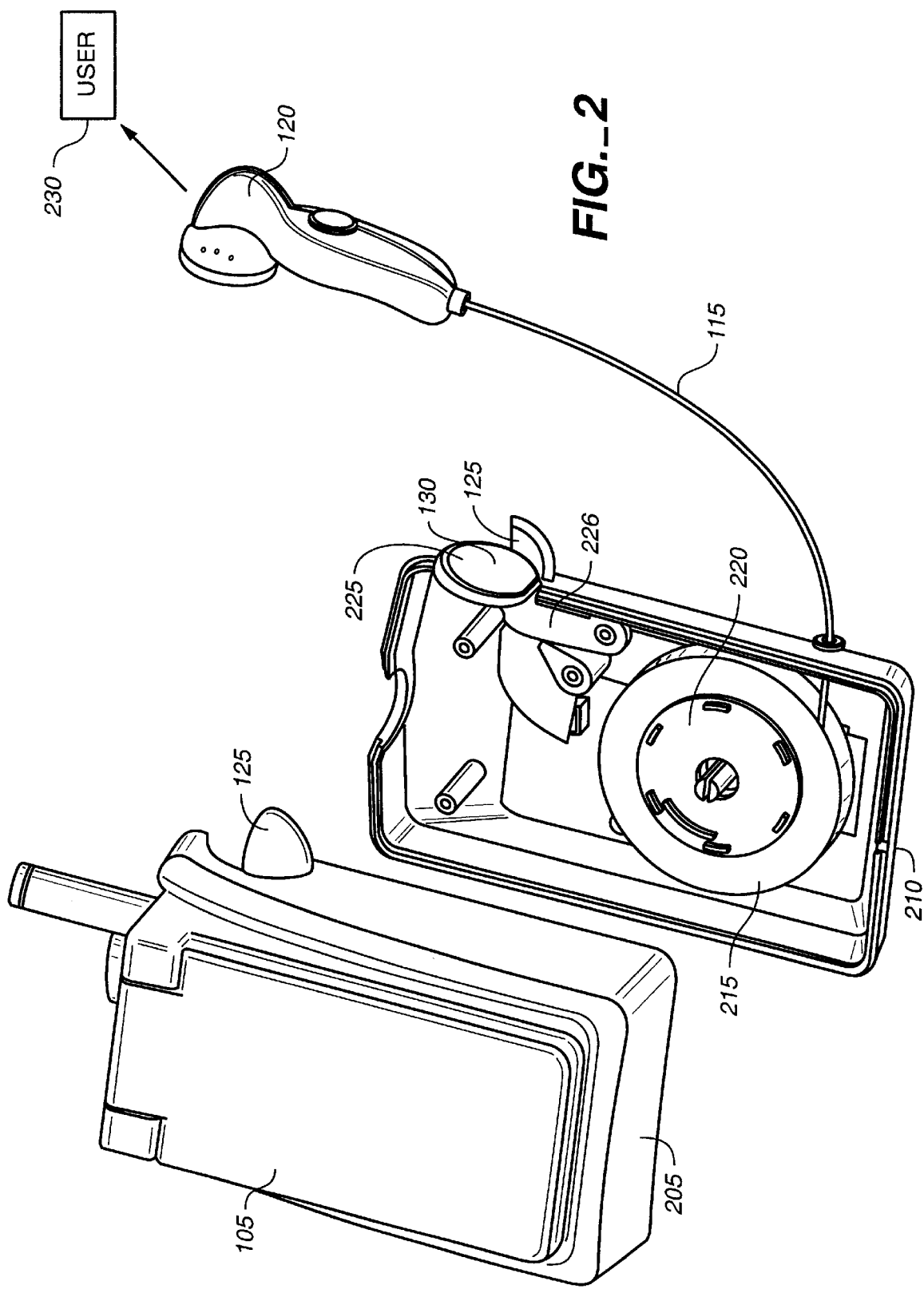
FIG._2

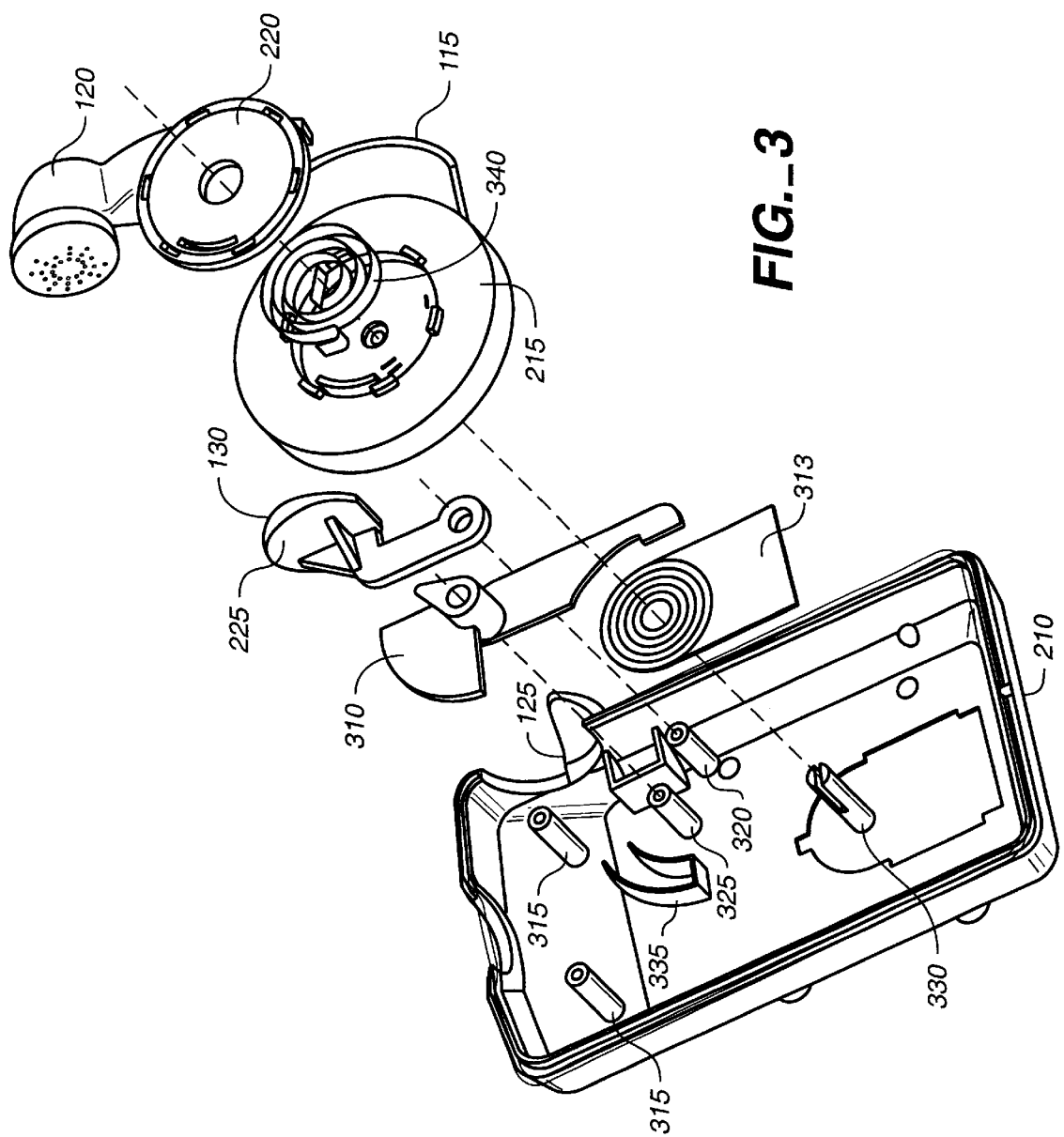
FIG._3

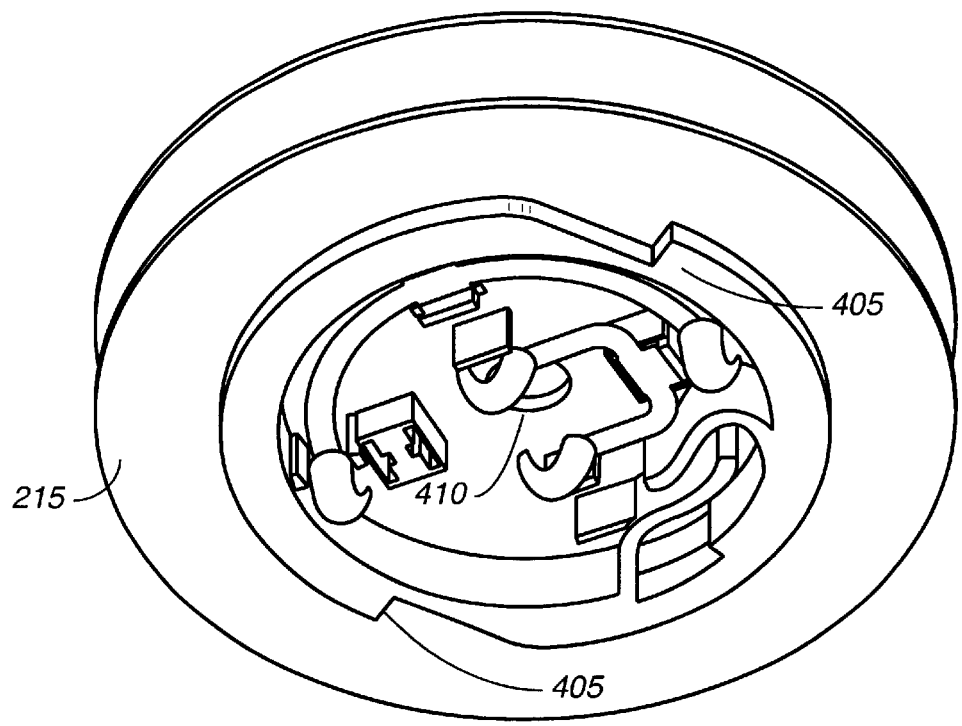
FIG._4
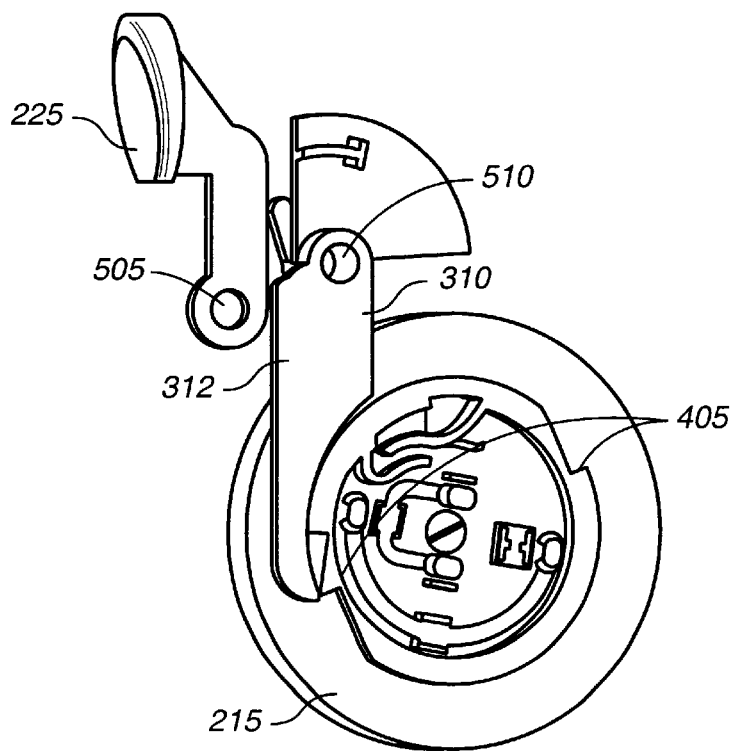
FIG._5

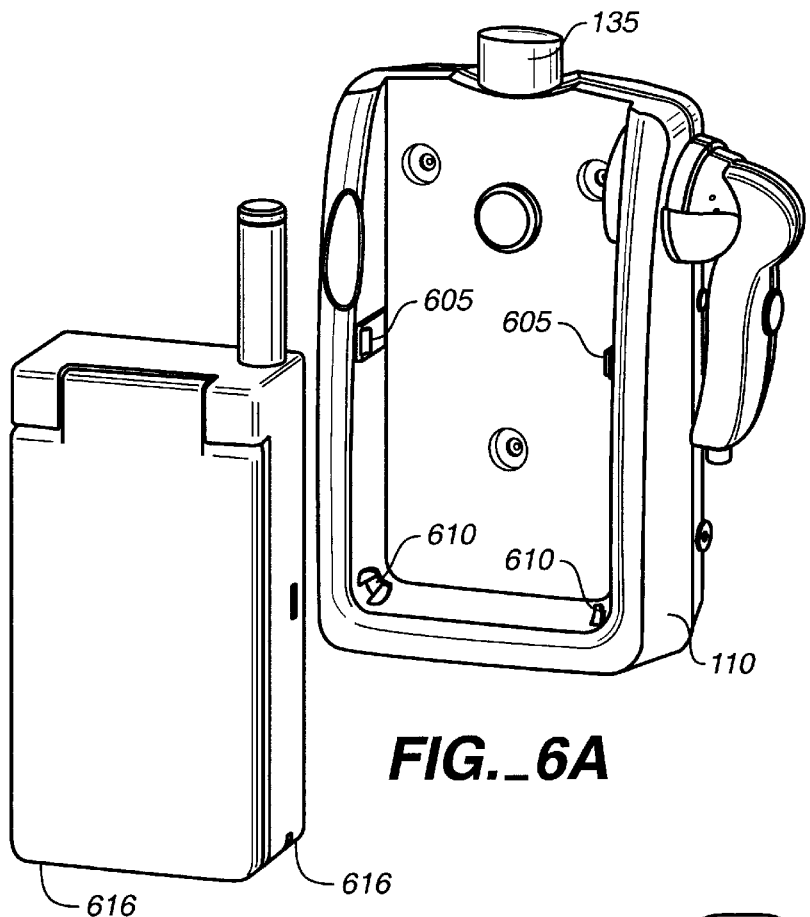
FIG._6A
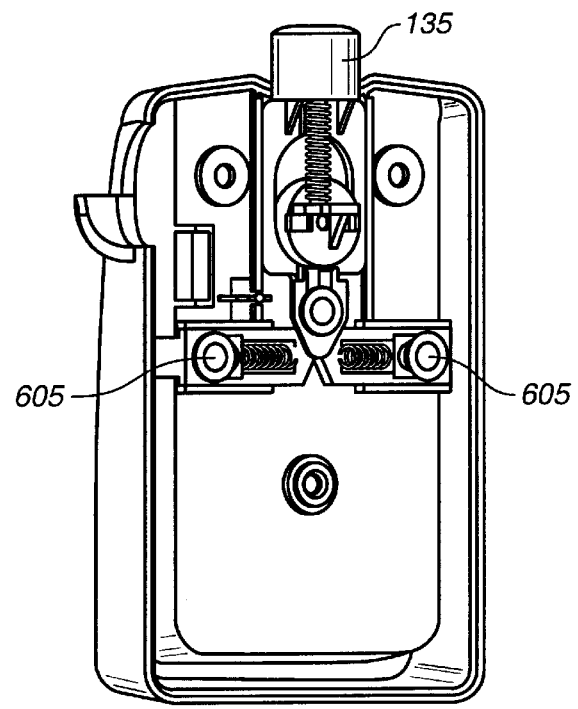
FIG._6B

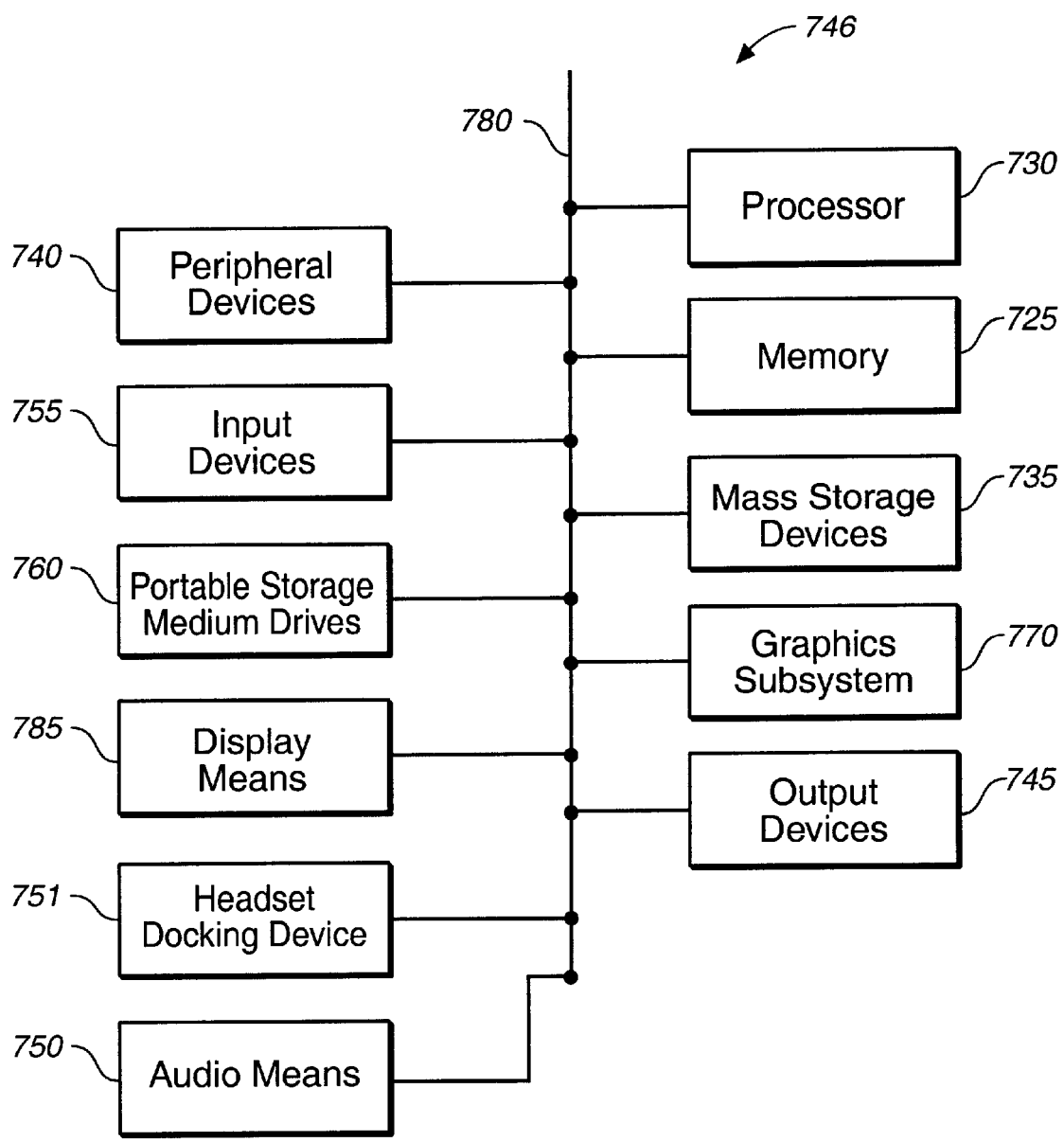
*FIG._7*

HEADSET DOCKING DEVICE

BACKGROUND OF THE INVENTION

1. Field of the Invention

The present invention relates generally to audio devices, and more particularly, to an improved headset docking device that is used with audio devices such as telephones and computers for retractably docking the headset to the audio device.

2. Description of the Related Art

Headsets have been used in the past to receive and transmit audio signals between a user and audio devices. However, these headsets have had limitations, particularly when used in conjunction with telephones and computers.

Telephone Headsets

The telephone has evolved in the recent past to become more mobile and "hands-free." Mobility advances have been seen by cellular phones or other cordless phones that have permitted the user to use the telephone anywhere needed, most notably in automobiles where users spend much of their time. It is in these automobiles where the "hands-free" ability of these telephones has had the most impact. Hands-free is understood to mean the ability to transmit and receive audio signals through the telephone without the user having to manually hold the telephone. However, even with hands-free telephones, there have been some limitations.

One of the main limitations with hands-free telephones is the poor audio performance. In conventional hands-free telephones, the main components of the hands-free telephones include a phone cradle, a loudspeaker to receive audio signals from the telephone and a microphone to transmit a user's audio signal (i.e. signal containing a user's voice) to the telephone. The poor audio performance results from the long distance between the user's mouth and the microphone that allows ambient noise to blend with the user's voice to cause noise. Even with current noise cancellation technology, the ambient noise interference creates poor audio performance. Additionally, the use of the loudspeaker increases ambient noise due to additional feedback that is created in closed areas, particularly in automobiles where mobile phones are increasingly being used. Outside of a closed environment, the ambient noise is even more of a problem since open spaces create opportunities for many different types of ambient noise to affect the audio performance.

To overcome these problems associated with loudspeakers, headsets have been used in conjunction with telephones to provide better quality audio reception and transmission to a user. These headsets are used in conjunction with cradles that hold the telephone in place in an automobile or on a user. The headsets are typically connected to the telephone or the cradle with a cord that transmits and receives the audio signals between the telephone and the user's ear and mouth. Unfortunately, the headset and cord combination create a unique set of problems that create further limitations with these types of "hands-free" devices.

One such problem is the placement of the headset and telephone when not in use. The headset and telephone may move in an automobile while driving to create a dangerous situation for one attempting to answer a telephone call or otherwise use the telephone and headset while driving. The phone and headset may not remain together in the automobile and therefore locating the phone and headset may create a danger while driving. Another problem includes the cord that becomes a distraction to a driver since the cord may become tangled or looped around other devices in the automobile. If this happens, problems may occur when a call arrives and the user tries to answer an incoming call when the headset cord becomes tangled.

To alleviate some of these concerns, certain telephones and cradles have created "reel-in" devices to reel in cords into the cradle when (1) a button is pushed or pulled on the cradle or (2) a "pull and release" of the cord is performed to activate cord retraction. These types of reel-in mechanisms have certain limitations. For example, an accidental push or pull of such a button may result in accidental cord retraction while the headset is on a user's head to result in cordage "whipping" of the user's face. Such an accidental push or pull of this button may very easily occur when the button is in an automobile or on the user. Also, if the reel-in is maintained at a constant tension, the headset may not remain in an ear due to this tension. Additionally, many cords are retracted in prior devices with a strong spring force that many times may injure the user due to the "whipping" action of the cord being retracted in the reel-in mechanism.

A need therefore exists for a hands-free telephone device that alleviates the limitations associated with these prior devices.

Computer Headsets

Headsets have also been used to receive and transmit audio signals between a user and a computer. Typically, the headsets are similar to the headsets used with telephones. Thus, many of the limitations described above with regard to the use of headsets with telephones apply to the use of headsets with computers. While the computer is typically not used in a mobile environment (such as in an automobile), similar problems exist when using a headset with a computer such as (1) placement of the cord and headset when not in use; (2) accidental pushing or pulling of a reel-in button in a cradle used in conjunction with a computer to reel-in the headset and cord used with a computer; and (3) the retraction of the cord into a cradle containing the cord with a strong spring force that may injure the user of a headset with a computer.

A need therefore exists to alleviate these same limitations in using headsets with a computer.

SUMMARY OF THE INVENTION

In one embodiment, a headset docking device is provided to alleviate these limitations that includes a headset, a headset dock and a reel activation button. The headset is connected to an audio device by a cord to enable hands-free transmission of audio signals between the audio device and a user of the headset. A headset dock accepts the headset when the headset is not in use by the user. The reel activation button is depressed upon placing the headset in the headset dock to instantaneously retract the cord when the headset is placed in the headset dock.

In another embodiment, an improved hands-free telephone device is provided that includes a telephone having an interface mechanism for transmitting and receiving audio signals and a cradle for receiving the telephone. The cradle is capable of receiving and transmitting audio signals with the telephone through a cradle interface mechanism. The cradle includes a headset, a headset dock and a reel activation button. The headset is connected to the cradle by a cord to enable hands-free transmission and reception of the audio signals between the telephone and the user. The headset dock accepts the headset when the headset is not in use by the user. The reel activation button is depressed when the headset is placed in the headset dock to instantaneously retract the cord into the cradle when the headset is placed in the headset dock.

In still another embodiment, the audio device is a computer that uses the headset docking device described above.

The improved hands-free telephone device therefore alleviates the problems in the past of the cord becoming tangled, the headset being misplaced, or the accidental depression/pulling of a button to activate the retraction of the cord.

BRIEF DESCRIPTION OF THE DRAWINGS

A more complete appreciation of the invention and many of the advantages thereof will be readily obtained as the same becomes better understood by reference to the detailed description when considered in connection with the accompanying drawings, wherein:

FIG. 1 is a perspective view of an embodiment of the headset docking device in use in a hands-free telephone device of the present invention;

FIG. 2 is a perspective view of an embodiment of the headset docking device in use in a cradle of the hands-free telephone device of the present invention;

FIG. 3 is a perspective view of an embodiment of the headset docking device in use in a cradle of the hands-free telephone device of the present invention;

FIG. 4 is a bottom view of an embodiment of the cord reel within the cradle of the hands-free telephone device of the present invention;

FIG. 5 is a perspective view of an embodiment of the hook switch, reel latch and cord reel within the cradle of the hands-free telephone device of the present invention;

FIG. 6A is a perspective view of an embodiment of the headset docking device in use in a hands-free telephone device of the present invention;

FIG. 6B is a perspective view of an embodiment of the headset docking device in use in a cradle of the hands-free telephone device of the present invention; and FIG. 7 is a block diagram view of an embodiment of a computer using the headset docking device of the present invention.

It is understood that the components in the Figures below are not necessarily to scale, emphasis instead being placed upon clearly illustrating the principles of the present invention. Moreover, in the Figures, like reference numerals designate corresponding parts throughout the several views of the Figures.

DETAILED DESCRIPTION OF THE PREFERRED EMBODIMENTS

The detailed description below describes various embodiments of the headset docking device of the present invention, particularly embodiments for use of the headset docking device in a telephone and a computer. It is understood, however, that the headset docking device is broadly applicable to many audio devices that transmit and receive audio signals between a user and the audio devices. As such, the present invention should not be limited to the embodiments provided below for exemplary purposes, but instead should be broadly interpreted as claimed below.

FIG. 1 is a perspective view of an embodiment of the headset docking device for use in the hands-free telephone device of the present invention. In FIG. 1, a telephone 105 has been inserted in a cradle 110 to form the hands-free telephone device 100. The telephone 105 may be any type of telephone well known in the art, and in one embodiment, is a cellular telephone. In alternative embodiments, the telephone 105 may also be any wireless telephone that has no cord attaching the phone to a base station, as is well known in the art. The telephone 105 is removably attached to the cradle 110 through a variety of latching mechanisms (e.g. telephone latches and cradle latches of FIG. 6). It is noted that the latching mechanism may change depending on the type (e.g. model) of the telephone being placed in the cradle 110. In one embodiment, the cradle 110 has fixed hooks (610 of FIG. 6) at the bottom of the cradle that the telephone is "snapped" into the cradle. The telephone 105 is able to interface with the cradle through a telephone interface mechanism (not shown) such as a dataport or telephone jack. Much like the latching mechanism, this type of interface mechanism depends on the model of the telephone. In essence, the interface mechanism is any means known to transmit data between the telephone and the cradle (e.g. a dataport or a cable through a phone jack). The cradle 110 also has a cradle interface mechanism (not shown) that is able to communicate with the telephone 105 so that audio signals may be received from the headset 120, through the cradle 110 and to the telephone 105. It is understood that the telephone 105 is able to transmit and receive signals through conventional data transmission means (e.g. analog, CDMA, TDMA, GPS, etc.), as are well known in the art. Connected to the cradle 110 by a cord 115 is a headset 120 which is used to receive and transmit audio signals from the cradle 110 to a user (not shown). In one embodiment, the interface mechanism is a data port (not shown). In an alternative embodiment, the interface mechanism is a headset jack on the telephone 105 that exchanges the audio signals between the cradle 110 and the telephone 105 as described above. Still on the cradle 110 of FIG. 1, there is a headset dock 125 that receives the headset 120 when not in use by the user. The cradle 110 may be made of any type of solid material, and in one embodiment, is made of injection molded plastic or other standard materials used in the consumer electronics industry (e.g. polycarbonate). The headset 120 is used to receive and transmit audio signals between the telephone 105 and a user and is placed in the headset dock 125 when not in use. When placed in the headset dock 125, a reel-activation button 130 is pressed which instantaneously retracts the cord 115 into the cradle 110 at the same time the headset 120 is placed in the headset dock 125. This feature allows the cord 115 to automatically be reeled in by the cradle 110 after the headset 120 is placed in the headset dock 125. This avoids limitations in the past that included tangled cords, reel-in devices that were always maintained at a constant tension, reel-in buttons that were accidentally pushed/pulled and other accidental reel-ins of the cord that occurred while the headset was still being used. Still in FIG. 1, a cradle button 135 is used to remove the telephone 105 from the cradle 110 as further described in FIG. 6B below.

FIG. 2 is a perspective view of an embodiment of the headset docking device in use in a cradle of the hands-free telephone device of the present invention. In FIG. 2, the telephone 105 is attached to a cradle case top 205 (holding the telephone 105) that has been opened from the cradle case bottom 210 in order to illustrate the elements within the cradle 110. It is understood that the cradle 110 is typically one piece (cradle case top 205 connected to the cradle case bottom 210) but has been opened in FIG. 2 for illustrative purposes only. The headset 120 has been removed from the headset dock 125 to be placed in an ear of a user 230. A hook switch 225 is also shown in FIG. 2 that is used to couple the reel activation button 130 to the reel latch (310 of FIG. 3) so as to pivot when the headset 120 is placed in the headset dock 125 to thereby activate reel-in of the cord 115. The hook switch 225 has the reel activation button 130 on one end and a hook switch assembly 226 on the other end, where the hook switch assembly 226 performs a pivoting action to activate reel-in of the cord 115 into the cradle 110 when the reel activation button 130 is pressed. A cord reel 215 holds the cord 115 and a spring cover 220 contains a spring (not shown) that is used to retract the cord 115 when the headset 120 is docked in the headset dock 125. In one embodiment, the elements shown in FIG. 2 are all made from the standard consumer electronic materials described above (e.g. injection molded plastic or polycarbonate).

FIG. 3 is a perspective view of an embodiment of the headset docking device in use in a cradle for the hands-free telephone device of the present invention. In FIG. 3, a hook switch 225 (that includes the reel activation button 130 on the one end and the hook switch assembly 226 (FIG. 2) on the other end) is coupled to a reel latch 310. It is noted that the coupling between the hook switch 225 and the reel latch 310 is such to allow a rotation between the two devices when the hook switch 225 is pressed by the reel activation button 130. As such, the hook switch 225 is also coupled to the reel activation button 130 that will be depressed when the headset 120 is placed in the headset dock 125. The reel latch 310 is coupled to the hook switch 225 to rotate when the hook switch 225 is pivoted upon being depressed by the reel activation button 130. Still in FIG. 3, a spring cover 220 covers a spring 340 that is used to reel in the cord 115 upon depression of the reel activation button 130. The cord reel 215 is used to maintain a tension on the cord 115 so that it is able to be reeled in. Also shown in FIG. 3 are a top cradle case connectors 315 and a hook switch connector 320, as well as a reel latch connector 325 and a cradle case/cord reel connector 330. All these connectors are used in order to secure the particular components into the cradle 110 and to maintain the cradle case top 205 (FIG. 2) against the cradle case bottom 210. A cord reel adapter 313 is used to securely place the cord reel 215 in the cradle case bottom 210. Reel latch guide 335 is used to control the rotation of the reel latch 310.

FIG. 4 is a bottom view of an embodiment of the cord reel in the cradle of the present invention. In FIG. 4, cord reel latches 405 are shown that are used to couple the hook switch 225 (that permits the cord reel 215 to rotate when the hook switch 225 is pivoted and the reel latch 310 is thereby rotated) to the cord reel 215. Again, the hook switch 225 is pivoted when the headset 120 is placed in the headset dock and the reel activation button is depressed to activate the cord reel 215 to retract the cord (not shown). A cord reel/cradle case connector 410 is also shown to connect the cord reel 215 to the cradle case bottom 210.

FIG. 5 is a perspective view of an embodiment of the hook switch, reel latch and cord reel combination of the headset docking device used in a hands-free telephone device of the present invention. In FIG. 5, the hook switch 225 is shown coupled to the reel latch 310 along a hook switch rotation center 505. The reel latch 310 is, in turn, coupled to the cord reel latch 405 by the reel latch arm 312 to rotate along a hook reel latch rotation center 510 as described below.

FIG. 6 is a perspective view of an embodiment of the headset docking device in use in a hands-free telephone device of the present invention. In FIG. 6, the telephone 105 is removed from the cradle 110 to expose cradle latches 605. The cradle latches 605 are used to mate with the telephone latches 615 to secure the telephone 105 in the cradle 110. Fixed hooks 610 on the cradle 110 are also used to mate with the cradle 110. Recess features 616 on the telephone 105 are used to mate with fixed hooks 610 on the cradle 110 to secure the telephone 105 to the cradle 110.

FIG. 6B is a perspective view of an embodiment of the headset docking device in use in a cradle of the hands-free telephone device of the present invention. In FIG. 6B, the cradle 110 has been opened to show the latching mechanisms used to secure the telephone 105 into the cradle 110. When the cradle button 135 is depressed, the downward pressure causes the cradle latches 605 to move outwardly away from the center of the cradle 110 to allow the telephone 105 to be removed from the cradle 110.

In use, the headset docking device used in a hands-free telephone device of the present invention operates as follows. The reel activation button 130 is depressed when the headset 120 is placed in the headset dock 125. When that depression occurs, the reel activation button 130 presses on the hook switch 225 so that the hook switch 225 pivots at the hook switch rotation center 505. When pivoting, the reel latch 310, which is coupled to the hook switch 225, rotates along the hook reel latch rotation center 510 and disengages the cord reel latch 405 to allow the cord reel 215 to rotate and thereby retract the cord (not shown). Thus, the cord instantaneously retracts into the cord reel 215 upon placing the headset in the headset dock 125 to avoid problems relating to a tangled cord, accidental reel-in of the cord due to accidental pushes/pulls of the button or other limitations in the prior devices.

The headset docking device may be used in a hands-free telephone, other telephones, a cellular telephone or even as a hands-free telephone device in an automobile. In alternative embodiments, the hands-free telephone device may be clipped onto a user. It is also noted that the cradle may be used independently of the telephone or that the cradle may be within the telephone or other audio device (e.g. computer).

The hands-free telephone device of the present invention thereby overcomes many limitations in the prior hands-free devices by providing a tangle-free cord, a docking headset that only triggers the cord reel-in When the headset is docked to thereby avoid accidental reel-ins and only requires a lower force of a spring tension since the headset is already docked when the retraction begins. Also, no accidental pushes of the button or pulls of the button occurs which may result in accidental reel-in of the cord. Further, no double pull is required to pull the cord in order to engage the spring tension. Also, any electromagnetic effects of the cellular phone are avoided since the headset is apart from any electro-magnetic radiation that may be received from the telephone itself.

FIG. 7 illustrates a high-level block diagram of a general purpose computer which is used, in one embodiment, in conjunction with the headset docking device of the present invention. The headset docking device 751 is incorporated into a general purpose computer 746 of FIG. 7. In one embodiment, the headset docking device 751 has a structure identical to the cradle 110 of FIGS. 1–6, except that the cradle 110 is connected to a computer, rather than a telephone. The audio device is therefore a computer and not a telephone in this embodiment. In another embodiment, the headset docking device 751 is within the computer, not in a cradle outside of the computer. It is understood, therefore, that the headset docking device of the present invention may be embodied in alternative embodiments other than the cradle 110 of FIGS. 1–6.

The general purpose computer 746 of FIG. 7 includes a processor 730 and memory 725. Processor 730 may contain a single microprocessor, or may contain a plurality of microprocessors, for configuring the computer system as a multi-processor system. Memory 725, stores, in part, instructions and data for execution by processor 730. Memory 725 may include banks of dynamic random access memory (DRAM) as well as high speed cache memory.

The computer of FIG. 7 further includes a mass storage device 735, peripheral device(s) 740, audio means 750, input device(s) 755, portable storage medium drive(s) 760, a graphics subsystem 770 and a display means 785. For purposes of simplicity, the components shown in FIG. 7 are depicted as being connected via a single bus 780 (i.e. transmitting means). However, the components may be connected through one or more data transport means (e.g. Internet, Intranet, etc.). For example, processor 730 and memory 725 may be connected via a local microprocessor bus, and the mass storage device 735, peripheral device(s) 740, portable storage medium drive(s) 760, and graphics subsystem 770 may be connected via one or more input/output (I/O) buses. Mass storage device 735, which is typically implemented with a magnetic disk drive or an optical disk drive, is in one embodiment, a non-volatile storage device for storing data and instructions for use by processor 730.

Portable storage medium drive 760 operates in conjunction with a portable non-volatile storage medium, such as a floppy disk, or other computer-readable medium, to input and output data and code to and from the computer system of FIG. 7. Peripheral device(s) 740 may include any type of computer support device, such as an input/output (I/O) interface, to add additional functionality to the computer system 746. For example, peripheral device(s) 740 may include a network interface card for interfacing computer system 746 to a network, a modem, and the like.

Input device(s) 755 provide a portion of a user interface. Input device(s) 755 may include an alphanumeric keypad for inputting alpha-numeric and other key information, or a pointing device, such as a mouse, a trackball, stylus or cursor direction keys. In order to display textual and graphical information, the computer 746 of FIG. 7 includes graphics subsystem 770 and display means 785. Display means 785 may include a cathode ray tube (CRT) display, liquid crystal display (LCD), other suitable display devices, or means for displaying, that enables a user to view information. Graphics subsystem 770 receives textual and graphical information and processes the information for output to display 785. The computer system 746 of FIG. 7 also includes an audio system 750. In one embodiment, audio means 750 includes a sound card that receives audio signals from a microphone that may be found in peripherals 740. In another embodiment, the audio system 750 may be a processor, such as processor 730, that processes sound. In one embodiment, the headset docking device 751 of the present invention is located within audio means 750. In an alternative embodiment, the headset docking device 751 is located as part of the input devices 755. Additionally, the computer of FIG. 7 includes output devices 745. Examples of suitable output devices include speakers, printers, and the like.

The devices contained in the computer system of FIG. 7 are those typically found in general purpose computer, and are intended to represent a broad category of such computer components that are well known in the art. The system of FIG. 7 illustrates one platform which can be used for practically implementing the method of the present invention. Numerous other platforms can also suffice, such as Macintosh-based platforms available from Apple Computer, Inc., platforms with different bus configurations, networked platforms, multi-processor platforms, other personal computers, workstations, mainframes, navigation systems, and the like.

Although the present invention has been described in detail with respect to certain embodiments and examples, variations and modifications exist which are within the scope of the present invention as defined in the following claims.

What is claimed is:

1. A hands-free telephone system, comprising:
   a telephone, the telephone having a telephone interface mechanism for transmitting and receiving audio signals;
   a headset, the headset enabling hands-free transmission and reception of the audio signals between the telephone and a user;
   a cradle for receiving the telephone and connected to the headset by a cord, the cradle being capable of receiving and transmitting audio signals with the telephone through a cradle interface mechanism interfacing with the telephone interface mechanism, the cradle comprising
      a headset dock, the headset dock accepting the headset when the headset is not in use by the user, and
      a reel activation button, the reel activation button being depressed upon placing the headset in the headset dock to instantaneously retract the cord into the cradle when the headset is placed in the headset dock.

2. The hands-free telephone system of claim 1, further comprising:
   a hook switch, the hook switched being coupled to the reel activation button so as to pivot when the headset is placed in the headset dock;
   a reel latch, the reel latch being coupled to the hook switch to rotate when the hook switch is pivoted; and
   a cord reel, the cord reel having a cord reel latch being coupled to the reel latch so that upon placing the headset in the headset dock, the reel activation button forces the hook switch to pivot to thereby rotate the reel latch that unlatches the cord reel to reel in the cord.

3. The hands-free telephone system of claim 2, wherein the cord reel further comprises:
   a spring for providing a spring tension to the cord reel, the spring tension being used to reel in the cord upon unlatching of the cord reel.

4. The hands-free telephone system of claim 1, wherein the telephone is a wireless telephone.

5. The hands-free telephone system of claim 1, wherein the telephone is a cellular telephone.

6. The hands-free telephone system of claim 1, wherein the cradle and telephone are used in an automobile.

7. The hands-free telephone system of claim 1, wherein the cradle is clipped to the user.

8. A cradle for receiving a telephone, the cradle being capable of receiving and transmitting audio signals with the telephone through a cradle interface mechanism interfacing with a telephone interface mechanism, the cradle comprising:
   a headset, the headset being connected to the cradle by a cord, the headset enabling hands-free transmission and reception of audio signals between the telephone and a user;
   a headset dock, the headset dock accepting the headset when the headset is not in use by the user; and a reel activation button, the reel activation button being depressed upon placing the headset in the headset dock to instantaneously retract the cord into the cradle when the headset is placed in the headset dock.

9. The cradle of claim 8, further comprising:

a hook switch, the hook switched being coupled to the reel activation button so as to pivot when the headset is placed in the headset dock;

a reel latch, the reel latch being coupled to the hook switch to rotate when the hook switch is pivoted; and a cord reel, the cord reel having a cord reel latch being coupled to the reel latch so that upon placing the headset in the headset dock, the reel activation button forces the hook switch to pivot to thereby rotate the reel latch that unlatches the cord reel to reel in the cord.

10. The cradle of claim 9, wherein the cord reel further comprises:

a spring for providing a spring tension to the cord reel, the spring tension being used to reel in the cord upon unlatching of the cord reel.

11. The cradle of claim 8, wherein the telephone is a wireless telephone.

12. The cradle of claim 8, wherein the telephone is a cellular telephone.

13. The cradle of claim 8, wherein the cradle and telephone are used in an automobile.

14. The cradle of claim 8, wherein the cradle is clipped to the user.

15. A method of retracting a cord in a cradle, comprising:

providing the cradle for receiving a telephone, the cradle being capable of receiving and transmitting audio signals with the telephone through a cradle interface mechanism interfacing with the telephone interface mechanism, the cradle comprising a headset, the headset being connected to the cradle by the cord, the headset enabling hands-free transmission and reception of the audio signals between the telephone and a user;

a headset dock, the headset dock accepting the headset when the headset is not in use by the user; and a reel activation button for retracting the cord; and depressing the reel activation button by placing the headset in the headset dock to instantaneously retract the cord into the cradle when the headset is placed in the headset dock.

16. The method of claim 15, wherein the telephone is a wireless telephone.

17. The method of claim 15, wherein the telephone is a cellular telephone.

18. The method of claim 15, wherein the cradle and telephone are used in an automobile.

19. The method of claim 15, wherein the cradle is clipped to the user.

* * * * *